(12) United States Patent
Lancaster et al.

(10) Patent No.: US 7,085,457 B2
(45) Date of Patent: Aug. 1, 2006

(54) UNDERGROUND ELECTRICAL CABLE WITH TEMPERATURE SENSING MEANS

(75) Inventors: Mark Lancaster, Brooks, GA (US); Thomas Wilki, Atlanta, GA (US); Eugene T. Sanders, Carrollton, GA (US); Kasi Hajra, Ontario (CA)

(73) Assignee: Southwire Company, Carrollton, GA (US)

( * ) Notice: Subject to any disclaimer, the term of this patent is extended or adjusted under 35 U.S.C. 154(b) by 105 days.

(21) Appl. No.: 10/657,388

(22) Filed: Sep. 8, 2003

(65) Prior Publication Data

US 2004/0109651 A1  Jun. 10, 2004

Related U.S. Application Data

(60) Provisional application No. 60/409,139, filed on Sep. 9, 2002.

(51) Int. Cl.
*H01B 9/02* (2006.01)
*H01B 3/30* (2006.01)
*G02B 6/44* (2006.01)

(52) U.S. Cl. .................. 385/101; 385/109; 385/113; 174/102 D; 174/102 R; 174/110 R; 174/110 PM; 174/112; 174/117 R

(58) Field of Classification Search ........ 385/100–114; 174/128, 102 R, 102 D, 106 SC, 106 D, 174/110 R, 110 PM, 112, 117 R, 117 F
See application file for complete search history.

(56) References Cited

U.S. PATENT DOCUMENTS

| | | | |
|---|---|---|---|
| 4,852,965 A | 8/1989 | Mullin et al. | |
| 4,952,020 A | 8/1990 | Huber | |
| 5,029,974 A | 7/1991 | Nilsson | |
| 5,651,081 A | 7/1997 | Blew et al. | |
| 5,696,863 A | 12/1997 | Kleinerman | |
| 5,917,977 A | 6/1999 | Barrett | |
| 5,991,479 A | 11/1999 | Kleinerman | |
| 6,049,647 A * | 4/2000 | Register et al. | 385/101 |
| 6,072,928 A | 6/2000 | Ruffa | |
| 6,236,789 B1 | 5/2001 | Fitz | |
| 2005/0078922 A1* | 4/2005 | Sanders et al. | 385/101 |

* cited by examiner

*Primary Examiner*—Frank G. Font
*Assistant Examiner*—Michael P. Mooney
(74) *Attorney, Agent, or Firm*—Smith, Gambrell & Russell, LLP

(57) ABSTRACT

An electrical cable having a holding member arranged within the cable for an optic fiber, which can be used for temperature sensing and/or communications. The holding member can replace one or more strands of the cable, be placed inside an interstice of the cable, be placed in between various layers of the cable, or placed in the jacket of the cable. At least one strength member may be adjacent to and/or attached to the holding member to provide additional protection for the optic fiber.

14 Claims, 12 Drawing Sheets

Fig. 30
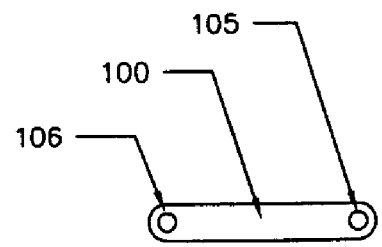
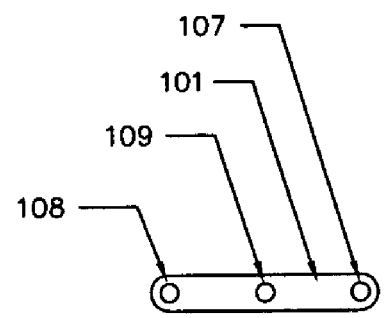
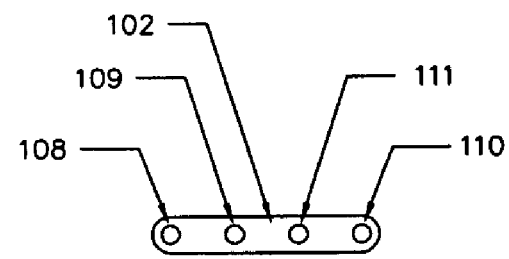
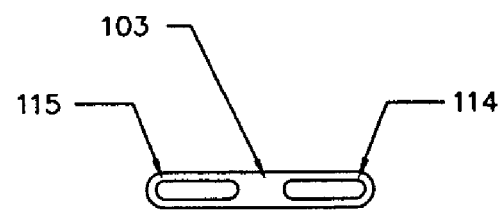
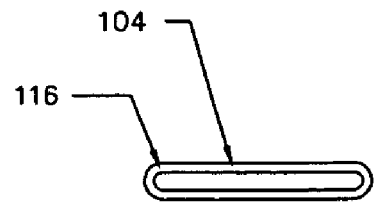

Fig. 31
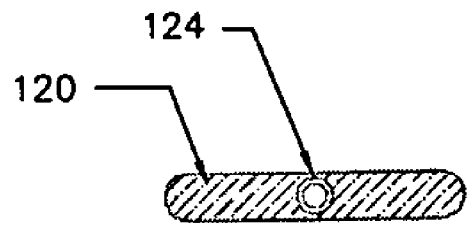
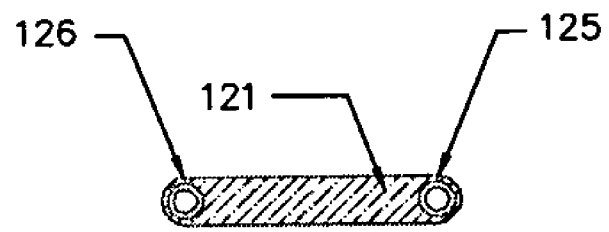
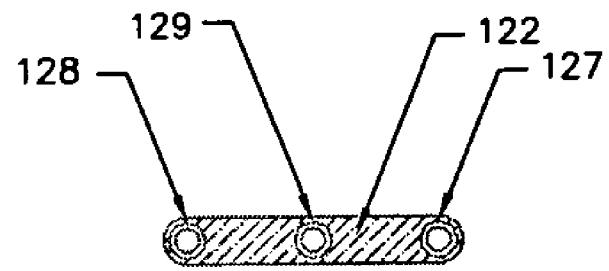
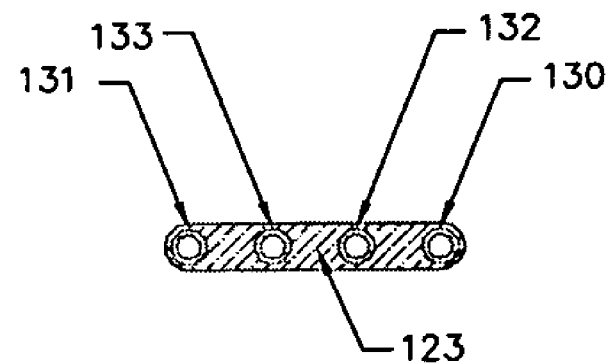

UNDERGROUND ELECTRICAL CABLE WITH TEMPERATURE SENSING MEANS

CROSS-REFERENCE TO RELATED APPLICATIONS

This application claims priority to provisional patent application Ser. No. 60/409,139, filed Sep. 9, 2002 which is relied on and incorporated herein by reference

BACKGROUND OF THE INVENTION

The present invention relates to an electrical cable with a temperature sensing means, and more specifically, to an electric cable that utilizes an optic fiber temperature sensing means placed longitudinally in the cable and having at least one strength member to provide additional protection for the optic fiber. It is desirable to accurately measure the temperature of a cable because the amount of electrical current that can be carried by a cable is limited by temperature. With accurate information regarding cable temperature, utility companies can make better use of their infrastructure.

It is relatively easy to estimate the temperature of a known conductor cable in a steady state ambient air temperature. In contrast, it is extremely difficult to determine the temperature of a cable under real world operating conditions due to the influence of wind, rain, solar radiation, and ever changing ambient air temperatures.

Conventional methods for measuring cable/conductor temperatures include Valley Group CAT-1 Tension Monitor, the EPRI Video Sagometer, and the USI donut. The CAT-1 method measures cable tension and weather conditions and the calculates the expected cable temperature using a thermal model. The EPRI Video Sagometer measures the cable sag and then calculates the expected cable temperature using a thermal elongation model. The USI donut uses two thermocouples placed on the outside surface of the transmission cable to measure its temperature at a single point. None of these methods measure the internal temperature of the cable/conductor or give real time temperature data for the length of the cable. Furthermore, they fail to satisfactorily measure cable temperature axially and radially throughout the entire length of the cable as can be obtained by the present invention.

The following U.S. patents describe temperature sensing with fiber optics and/or detail cables having optic fibers and electrical conductors.

U.S. Pat. No. 5,696,863 details fiber optic methods and devices for sensing physical parameters, like temperature or force.

U.S. Pat. No. 5,991,479 details distributed fiber optic sensors to measure temperature at different points along the fiber.

U.S. Pat. No. 4,852,965 details a composite optical fiber-copper conductor, which includes one or more reinforced optical fiber units and one or more metallic conductor pairs enclosed in a sheath system.

U.S. Pat. No. 4,952,020 details a ribbon cable having optical fibers and electrical conductors spaced side to side within a flexible jacket.

U.S. Pat. No. 5,029,974 details a gel-filled plastic buffer tube for carrying optical fibers.

U.S. Pat. No. 5,651,081 details a composite fiber optic and electrical cable having a core which loosely contains at least one optical fiber, one or more electrical conductors having an outer polymer insulating layer, one or more strength members, and a surrounding protective jacket.

U.S. Pat. Nos. 5,917,977 and 6,049,647 detail a composite cable having a conductor and at least one fiber optic conductor in the core.

U.S. Pat. No. 6,072,928 relates to a tow cable for measuring temperature in a water column having a fiber optic core, an electrically conducting polymer jacket, and a temperature sensor embedded in the polymer jacket.

U.S. Pat. No. 6,236,789 details a composite cable for access networks having one or more buffer tubes, each buffer tube encircling at least two optical fibers for supplying optical signals to at least two of the units, each unit having electrical current and voltage requirements. The cable has a layer of S-Z stranded electrically insulated conductors around the buffer tube or tubes. The number of pairs of conductors is less than the number of active optical fibers which excludes conductor spares. Preferably, the buffer tubes are S-Z stranded. The cable also includes a strength member and an outer plastic jacket encircling the buffer tubes, the conductors and the strength member.

SUMMARY OF THE INVENTION

The present invention comprises an electrical conductor/cable having a holding member or a protective tube for optic fibers. The holding member can contain one or more optic fibers. At least one strength member is adjacent to and/or attached to the holding member to provide additional protection for the optic fiber.

The holding member can be located in the interstices of the stranded cable or replace a strand of the cable. The holding member can be located in an interstice formed by the reinforcing strands and/or the conductive strands because the holding member has a diameter smaller than the size of an interstice. More than one holding member can be stranded into one or more interstices of the cable. The member can be placed in the cable in a longitudinal fashion or a helical wrap around the inner insulated cable. Alternatively, the holding member can replace a reinforcing strand and/or a conductive strand in the cable.

The holding member can be made so that it includes an optic fiber or it can be placed into the cable without an optic fiber. If an optic fiber is present, it can be used for temperature monitoring and/or communications. An optic fiber inside the a holding member could be used for similar or different functions when compared to another optical fiber that may be protected by the same or different holding member.

To determine temperature, an optic fiber can be used to accurately determine real-time thermal operating limits. For example, the optic fiber could be used to determine thermal properties of an overhead transmission line axially throughout the entire length of the line using distributed temperature sensing.

The holding member can be placed in a variety of electrical cables and should be resistant to crushing because the optic fiber within may be damaged and rendered useless if the member is crushed. Furthermore, it is also advantageous to distribute the pressure placed on the inner insulated conductor from such a member. Distribution of pressure results in less indentation of the outer layer of the insulation of the core conductor by the member, which would be to the advantage of maintaining the integrity of the insulation.

To achieve resistance to crushing and distribute pressure, the fiber holding member may have an oval outer periphery. The member can be made completely of stainless steel or a combination of stainless steel and dielectric type plastic. The member can be made in several configurations to have void areas in which to locate optic fibers, gel, and the like.

To avoid twisting an optical fiber contained in a holding member, the holding member may be placed longitudinally in the jacket material. The holding member is placed in this position during the process of placing the jacket onto a cable with either a core/neutral wire assembly or core/welded armor assembly. The holding member is longitudinally placed on the core assembly then the plastic jacket is extruded on this assembly effectively embedding the member into the jacket.

The holding member may alternatively be added to the neutral layer or substituted for a neutral strand. The holding member would have the same spiraling position along the cable as the neutrals. By placing the holding member onto the cable longitudinally the holding member containing the fiber is not twisted.

Other ways to avoid twisting include placing the holding member longitudinally between the core and the bed tape of the cable, or placing the holding member longitudinally between the neutral strand layer and the water swellable tape.

Advantageously at least one strength member is adjacent to and/or attached to the holding member to provide additional protection for the optic fiber.

BRIEF DESCRIPTION OF THE DRAWINGS

FIG. 30 depicts a variety of configurations associated with the holding members.

FIG. 31 depicts further configuration varieties for the holding member.

DETAILED DESCRIPTION

Figure 20:
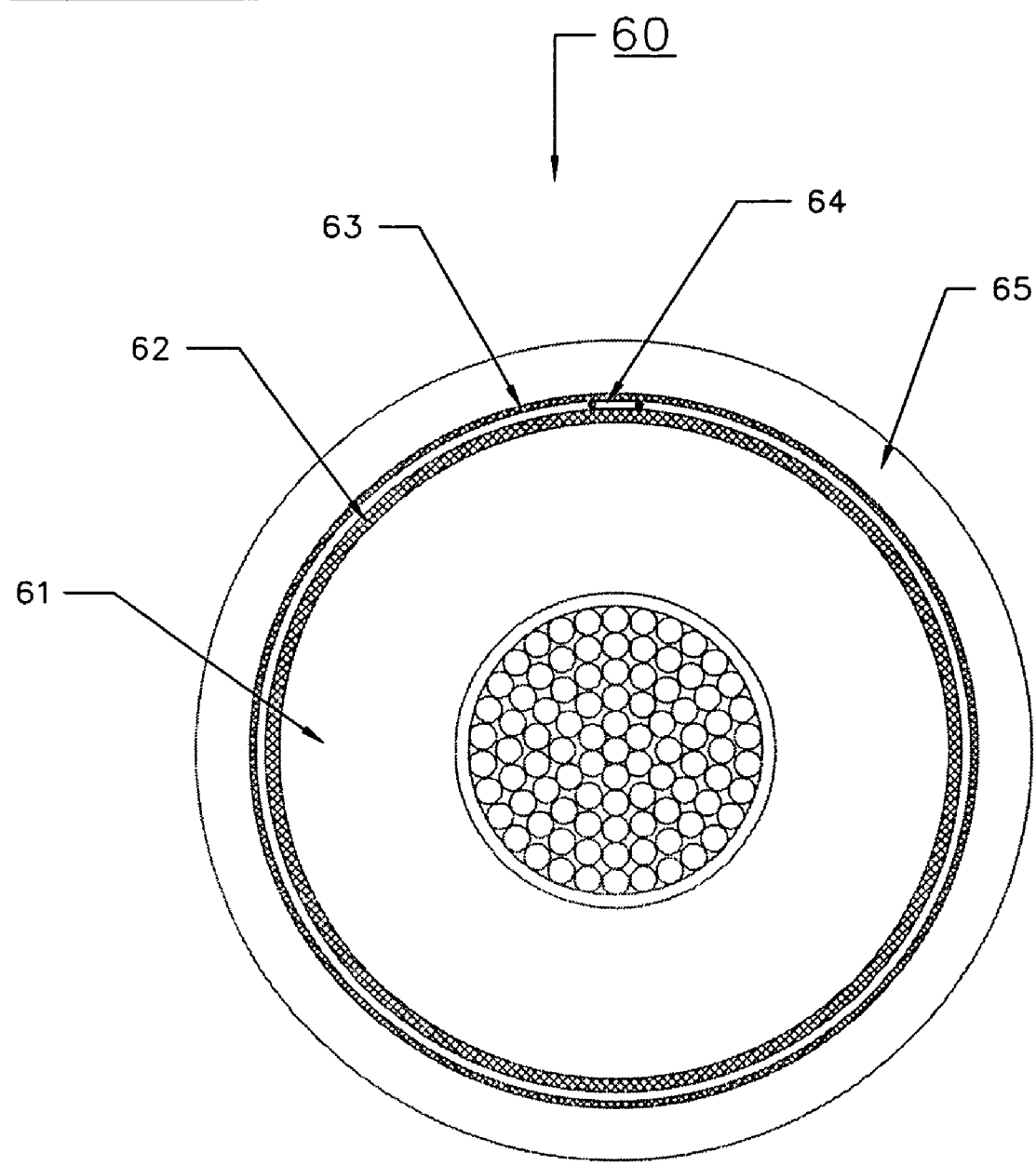
FIG. 20 depicts a cross section of a welded corrugate armor shield type high voltage cable having a holding member located in between a layer of tape and corrugated welded armor.
Figure 21:
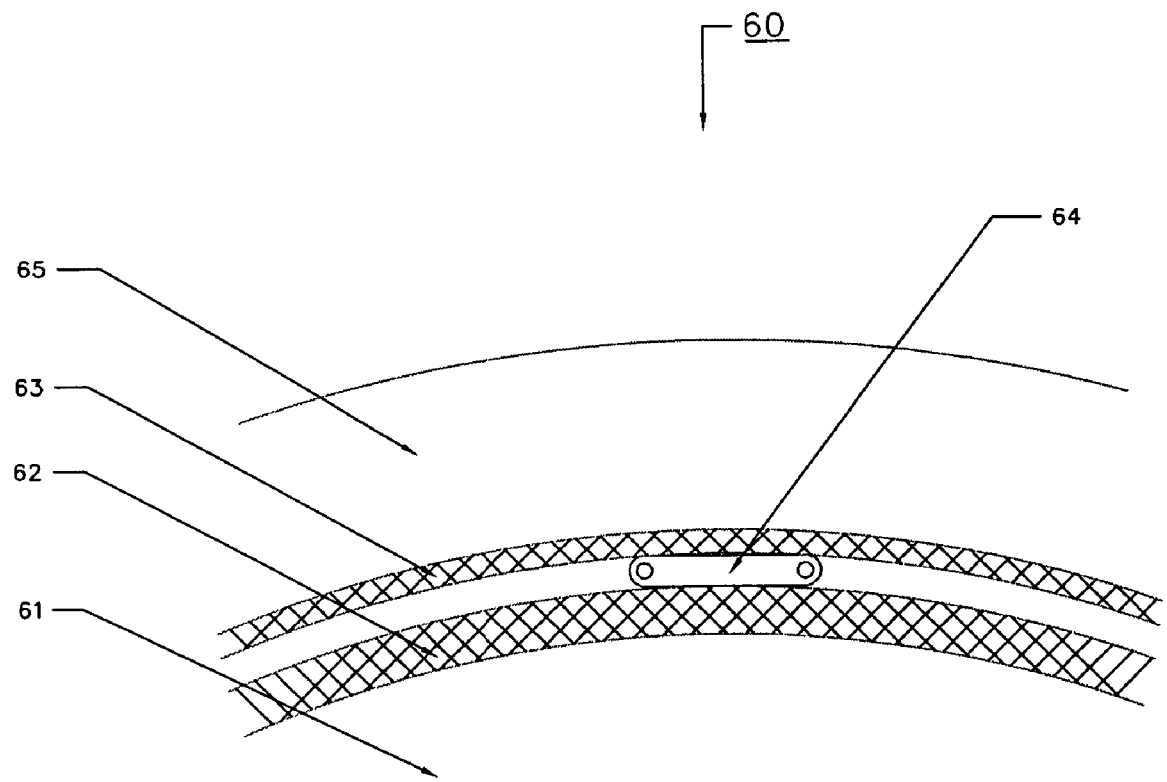
FIG. 21 depicts a partial cross section of the aforementioned embodiment.

FIGS. 20 and 21 shows a cross section of a welded corrugate armor shield type high voltage conductor cable (60). FIG. 20 shows a whole cross section of the conductor cable (60), while FIG. 21 shows a partial cross-section of the conductor cable (60). The core (61) of the conductor cable (60) is covered by a layer of insulation/bedding tape (62). The layer of insulation/bedding tape (62) is completely or partially surrounded by a layer of corrugated welded armor (63). The corrugated welded armor is covered by a jacket (65). One holding member (64) is located in between the layer of insulation/bedding tape and the corrugated welded armor (63). The holding member (64) may have oval, circular, or like cross section shape. The holding member can be placed in the conductor cable (60) in a longitudinal fashion or a helically wrapped around the core (61). The holding member (64) can be held in place by a binder string, tape, or other connective means.

Advantageously an elongated oval shape of the holding member (64) imparts crush resistance and distributes pressure. If the holding member (64) is crushed, then the optic fiber (66) within may be damaged and rendered useless. Furthermore, an oval shape distributes pressure so that there is less indentation of the insulation/bedding tape (62), which maintains the integrity of the layer of insulation/bedding tape (62).

The holding member (64) can be made from a variety of materials such as metals, composites, plastics, and/or a combination thereof. For example, the holding member (64) can be made of stainless steel or a combination of stainless steel and dielectric plastic.

Figure 22:
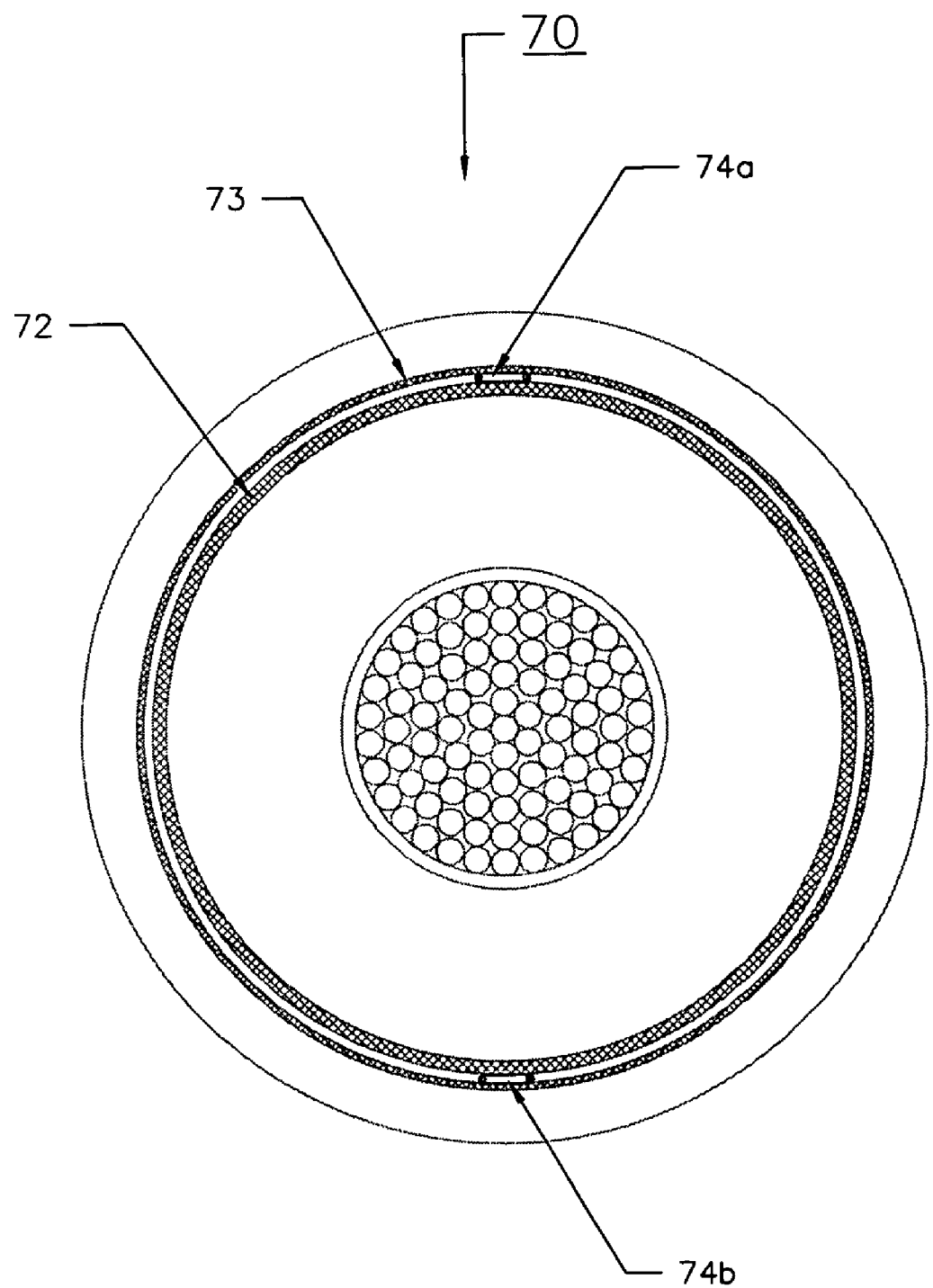
FIG. 22 depicts an embodiment of the cable having two holding members.

FIG. 22 illustrates an embodiment of the welded corrugate armor shield type high voltage conductor cable (70) having two holding members (74a and 74b) located approximately opposite of each other. The second holding member (74b) can be located in between the layer of tape (72) and the armor (73) or can be located elsewhere in the cable (70).

Figure 23:
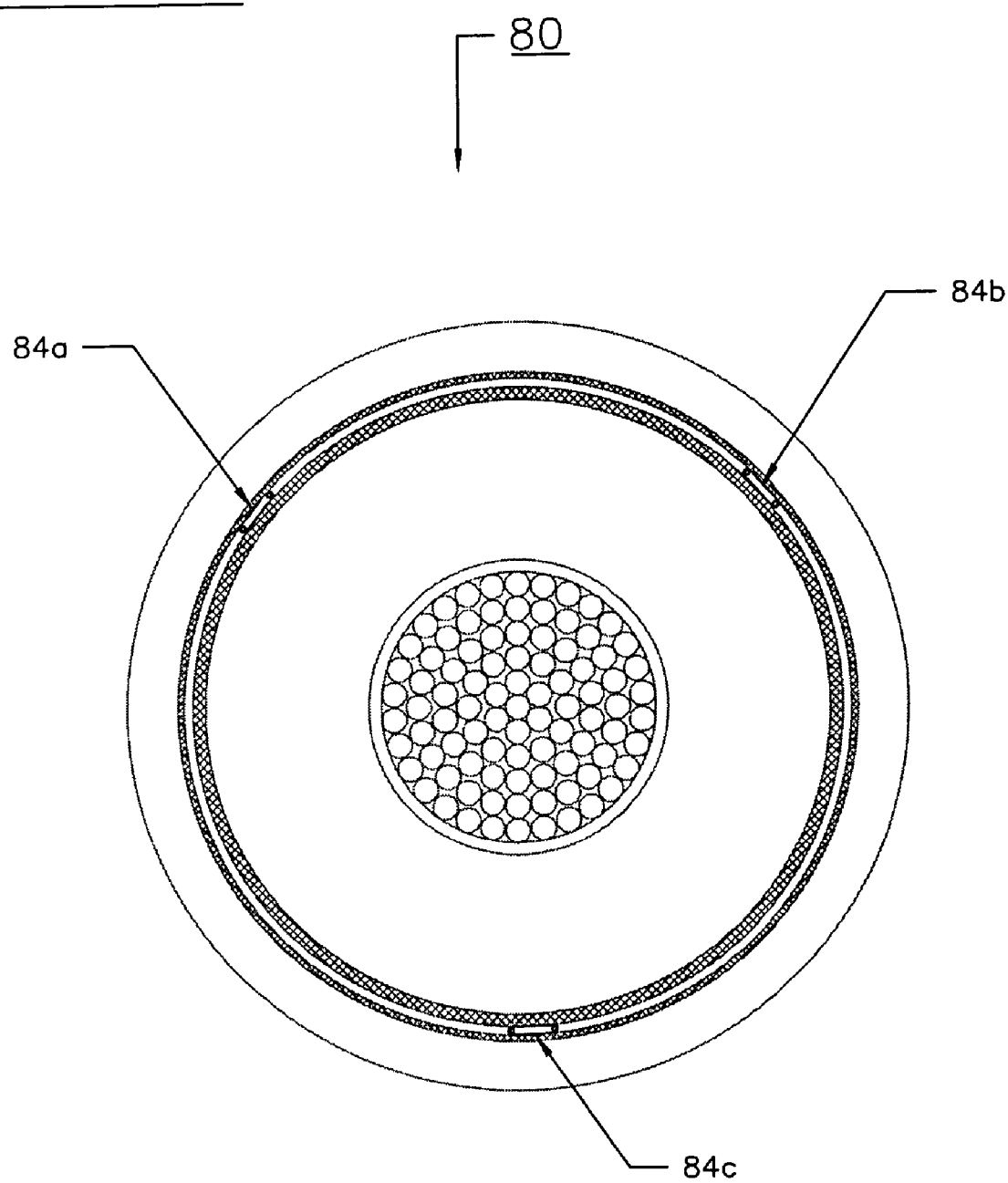
FIG. 23 depicts an embodiment of the cable having three holding members.

FIG. 23 details another embodiment of the welded corrugate armor shield type high voltage conductor cable (80) having three holding members (84a, 84b, and 84c) that are approximately equidistant from each other forming a triangular shape in cross section. The three holding members (84a, 84b, and 84c) can have similar or different arrangements in the cable (80).

Figure 24:
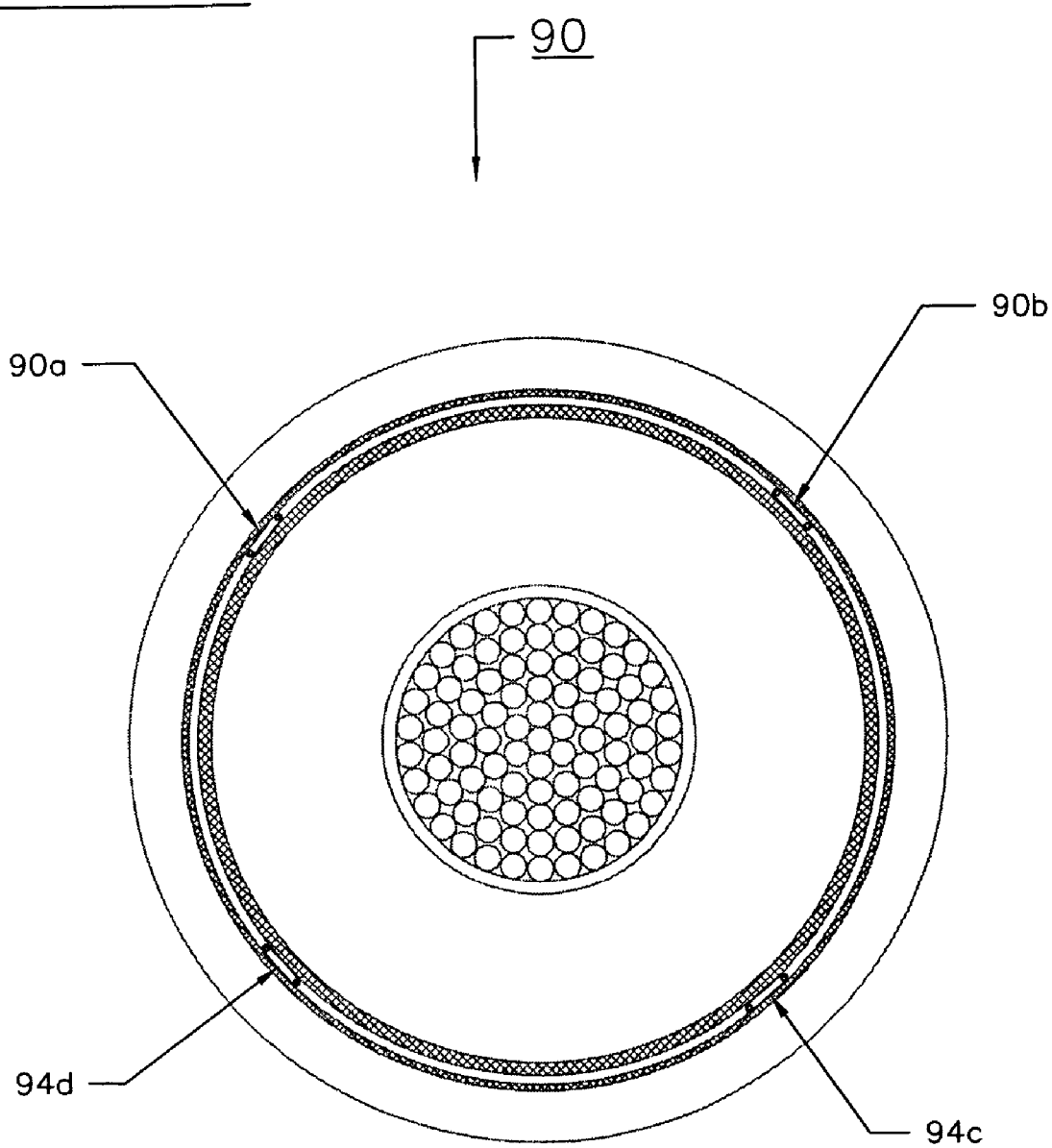
FIG. 24 depicts an embodiment of the cable having four holding members.

FIG. 24 depicts an alternative embodiment of the welded corrugate armor shield type high voltage conductor cable (90) having four holding members (94a, 94b, 94c, and 94d). This depicted embodiment also shows an equidistant relationship between the holding members (94a, 94b, 94c, and 94d), which results in a diamond shape in cross section. The holding members (94a, 94b, 94c, and 94d) can be arranged between similar or different components of the cable (90).

The equidistant relationship illustrated in FIGS. 22–24 is not controlling and other arrangements are possible.

FIG. 30 illustrates first, second, third, fourth, and fifth cross sections of various holding members (100, 101, 102, 103, and 104), which can have variable sizes, opening sizes, and wall thickness.

The first cross section of the holding member (100) has a width that is more than two times its height. The first cross section of the holding member is shaped so as to have two circular openings (105, and 106) on opposite ends of the holding member (100). The first cross section of the holding member (100) has a width that is more than twice the height of the holding member (100). The circular openings (105, and 106) are located approximately an equal distance from the sides of the holding member (100) and so that an imaginary line could be formed that passes through the diameters of the circular openings (105, and 106). Such a construction allows the holding member (100) to separate at least two fiber optic cables or at least two bundles of fiber optic cables (not shown).

The second cross section of the holding member (101) has a shape forming three circular openings (107, 108, and 109). Two of the circular openings (107, and 108) are located near opposite ends of the holding member (101), while the third circular opening (109) is located near the center of the holding member (101). The distance between the third circular opening (109) and the circular openings (107, and 108) located near the ends of the holding member (101) are approximately equal in distance. Such a construction allows the holding member (101) to separate three fiber optic cables or three bundles of fiber optic cables (not shown).

The third cross section of the holding member (102) has a shape forming four circular openings (110, 111, 112, and 113). To of the circular openings (110, and 111) are located towards the ends of the holding member (102), while the other two circular openings (111, and 112) are located in between circular openings (110, and 111) located towards the ends of the holding member (102). Such a construction allows the holding member (102) to separate four fiber optic cables or four bundles of fiber optic cables (not shown).

The fourth cross section of the holding member (103) has a shape forming two oval openings (114, and 115) on opposite ends of the holding member (103). The oval openings (114, and 115) are located approximately an equal distance from the sides of the holding member (103) and so that an imaginary line could be drawn that passes through an equal amount of each oval opening (114, and 115). Such a construction allows the holding member (103) to separate at least two fiber optic cables or at least two bundles of fiber optic cables (not shown).

The fifth cross section of the holding member (104) has a shape forming one oval opening (116) that is proportionate to the overall cross section of the holding member (104). The oval opening (116) allows the holding member (104) to hold at least one fiber optic cables or at least one bundle of fiber optic cables.

The aforementioned first, second, third, fourth, and fifth cross section (100, 101, 102, 103, and 104) shown in FIG. 30 advantageously are formed from stainless steel in the depicted embodiments. One skilled in the art would recognize that a variety of materials could be utilized, such as other metals, plastics, composites, and the like.

FIG. 31 depicts additional cross sections of holding members (120, 121, 122, and 123). The first illustrated cross section of the holding member (120) is oval shaped and formed from a dielectric plastic, composite, or stainless steel. The holding member (120) supports a tube (124) formed from a material, such as stainless steel, composite, or plastic. The tube (124) can be made from the same or different material from the holding member (120). The tube (124) in the depicted embodiment is located at an equal distance from the ends of the holding member (120). However, the tube (124) could be located anywhere within the holding member (120). The single tube (124) allows at least one fiber optic cables or at least one bundle of fiber optic cables (not shown) to be placed in the holding member (120).

The second cross section of the holding member (121) is oval shaped and formed from a dielectric plastic, composite, or stainless steel. The holding member (121) supports two tubes (125 and 126) located on opposite ends of the holding member (121). The tubes (125, and 126) can be made from the same or different material from the holding member (121). The tubes (125, and 126) are located approximately an equal distance from the sides of the holding member (121) and so that an imaginary line could be formed that passes through the diameters of the tubes (125, and 126). Such a construction allows the holding member (121) to separate at least two fiber optic cables or at least two bundles of fiber optic cables (not shown).

The third cross section of the holding member (122) is oval shaped and formed from a dielectric plastic, composite, or stainless steel. The holding member (122) supports three tubes (127, 128, and 129). Two tubes (127, and 128) are located on opposite ends of the holding member (122). The third tube (129) is located in between the two tubes (127, and 128) located on opposite ends of the holding member (122). The tubes (127, 128, and 129) can be made from the same or different material from the holding member (122). Likewise, the tubes (127, 128, and 129) can be made from different materials in respect to each other. The tubes (127, and 128) are located approximately an equal distance from the sides of the holding member (122) and an imaginary line could be drawn that passes through the diameters of the tubes (127, 128, and 129). Such a construction allows the holding member (122) to separate three fiber optic cables or three bundles of fiber optic cables (not shown).

The fourth cross section of the holding member (123) is oval shaped and formed from dielectric plastic, composite, or stainless steel. The holding member (123) supports four tubes (130, 131, 132, and 133). Two tubes (130, and 131) are located on opposite ends of the holding member (123). Two inner tubes (132, and 133) are located in between the two tubes (130, and 131) located on opposite ends of the holding member (123). The tubes (130, 131, 132, and 133) can be made from the same or different materials than the holding member (123). Likewise, the tubes (130, 131, 132, and 133) can be made from different materials in respect to each other. The tubes (130, 131, 132, and 133) are equally spaced and an imaginary line could be drawn that passes through the diameters of the tubes (130, 131, 132, and 133). Such a construction allows the holding member (123) to separate four fiber optic cables or three bundles of fiber optic cables.

Figure 40:
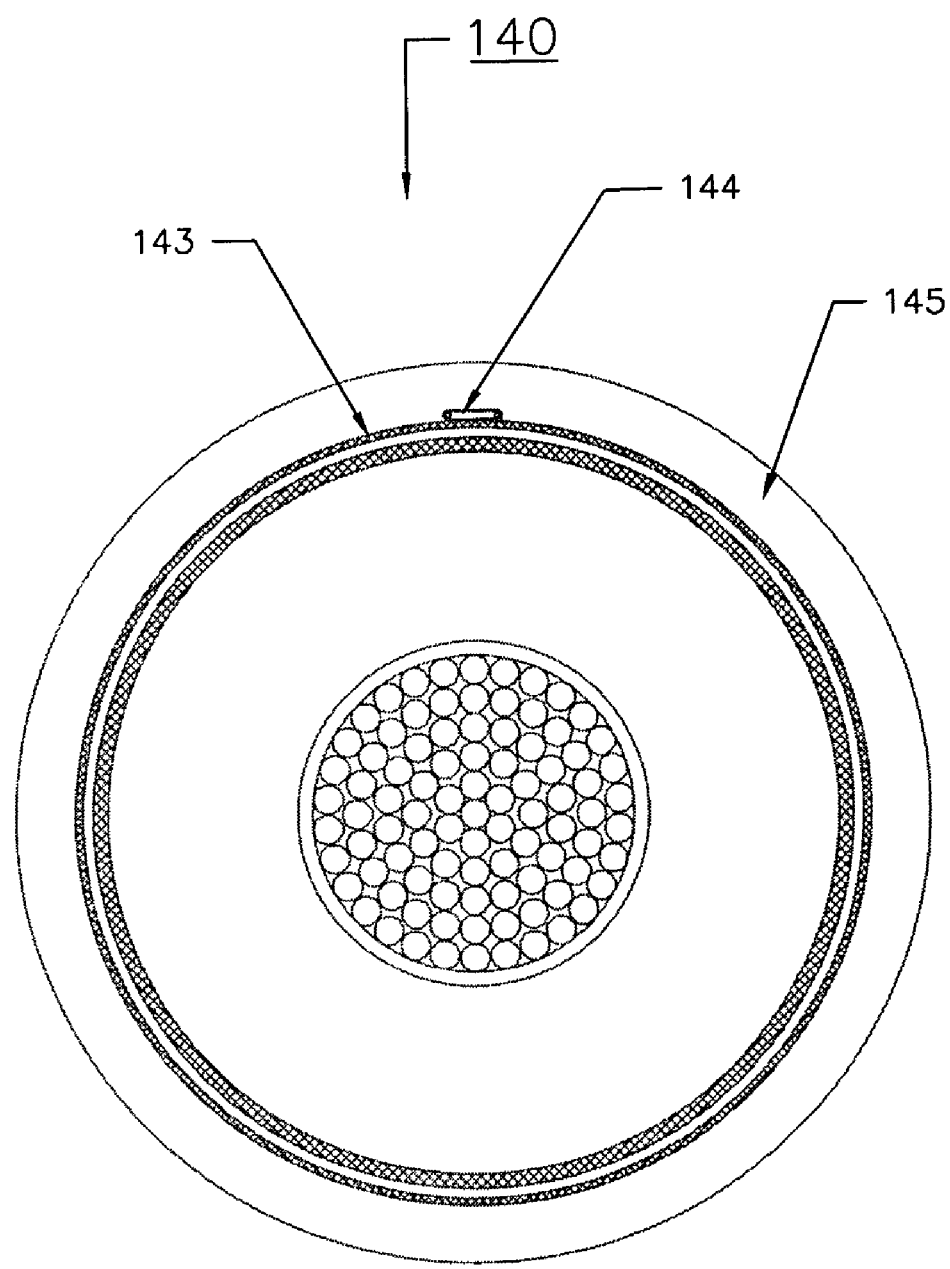
FIG. 40 is a cross section of a cable where the holding member is placed in the jacket material.

FIG. 40 depicts an embodiment of a welded corrugate armor shield type high voltage conductor cable (140) wherein the holding member (144) is arranged longitudinally in the jacket material (145) on the exterior of the corrugated welded armor (143). This arrangement avoids twisting of the optical fibers (not shown) contained in the holding member (144). This arrangement is possible with either a core/neutral wire assembly or a core/welded assembly. The holding member (144) is arranged longitudinally on the cable (140) and then the jacket material (145) is extruded on the assembly to effectively embed the holding member (144) into the jacket material (145).

Figure 50:
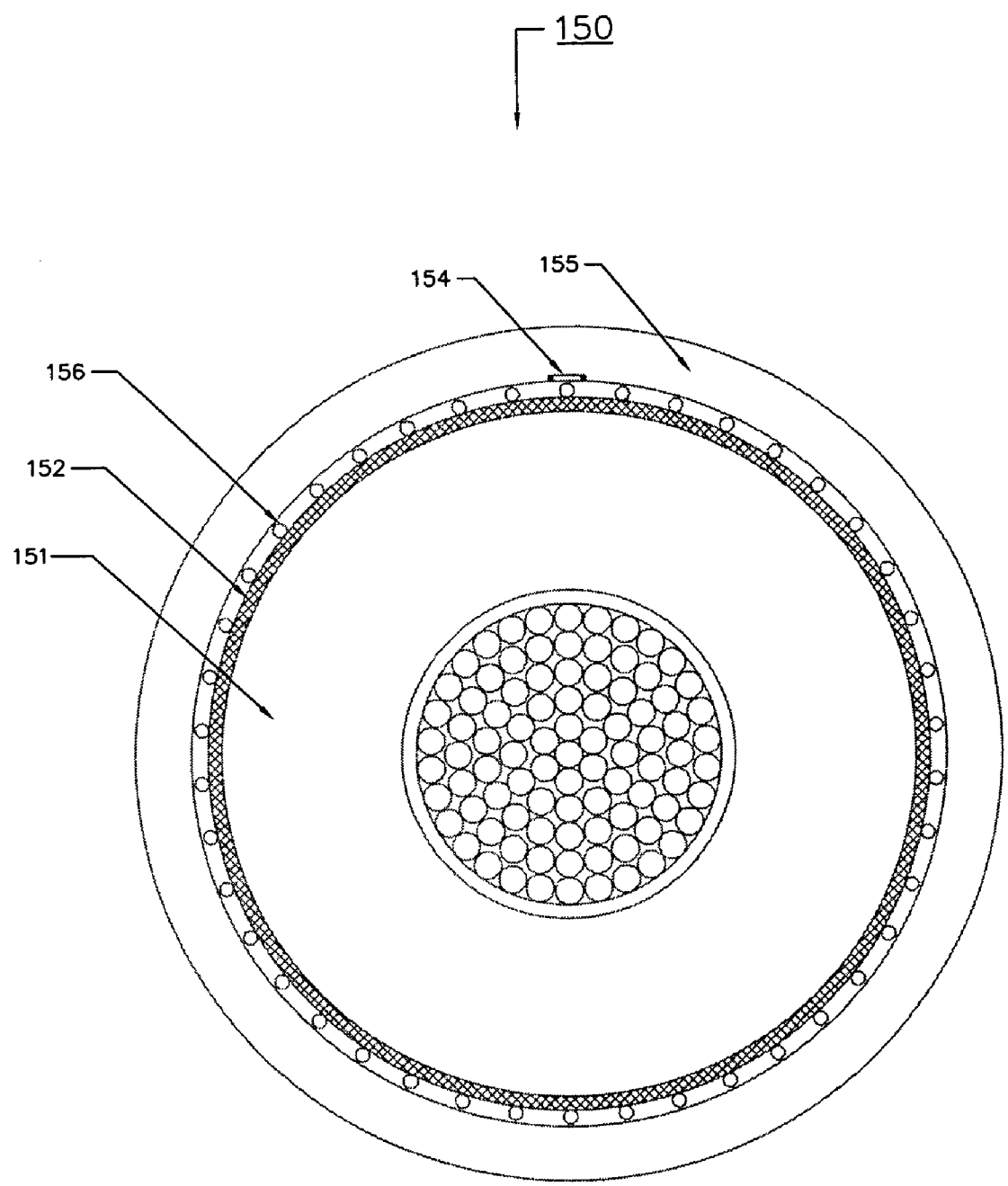
FIG. 50 is a cross section of a cable where stranded neutrals and the holding member are embedded in the jacket material.

FIG. 50 depicts an embodiment where a conductor cable (150) has a core (151) surrounded by a insulation/bedding tape (152). Concentric stranded neutrals (156) are placed on top of the insulation/bedding tape (152) and surrounded by jacket material (155). A holding member (154) is embedded in the jacket material (155).

Figure 60:
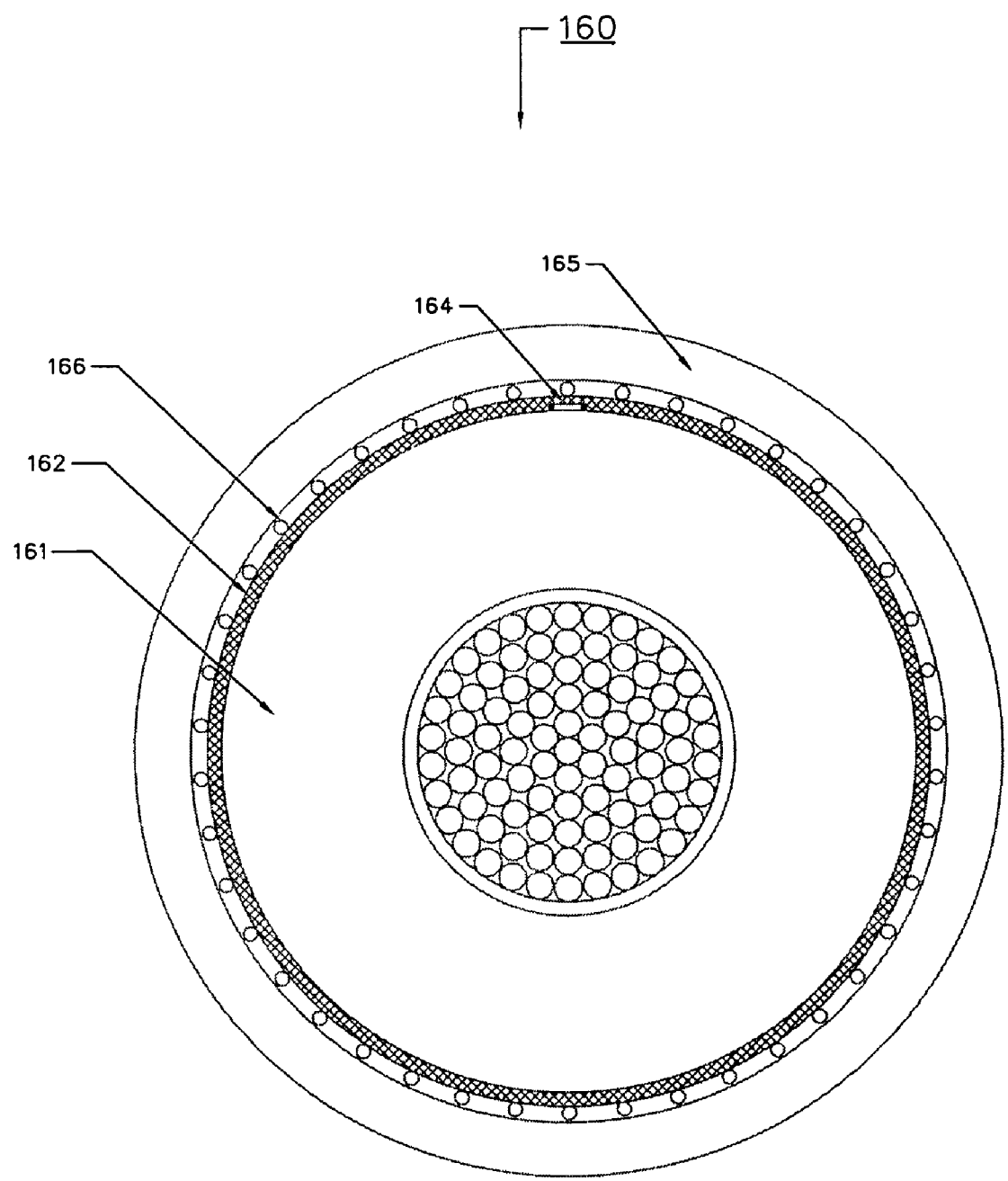
FIG. 60 is a cross section of a cable where the holding member is placed in between the core and the layer of tape.

FIG. 60 illustrates another embodiment wherein the holding member (164) is placed in between the core (161) of the conductor cable (160) and the layer of insulation/bedding tape (162). Concentric stranded neutrals (166) are placed over the layer of insulation/bedding tape (162). A jacket (165) is formed on the concentric stranded neutrals (166).

Figure 70:
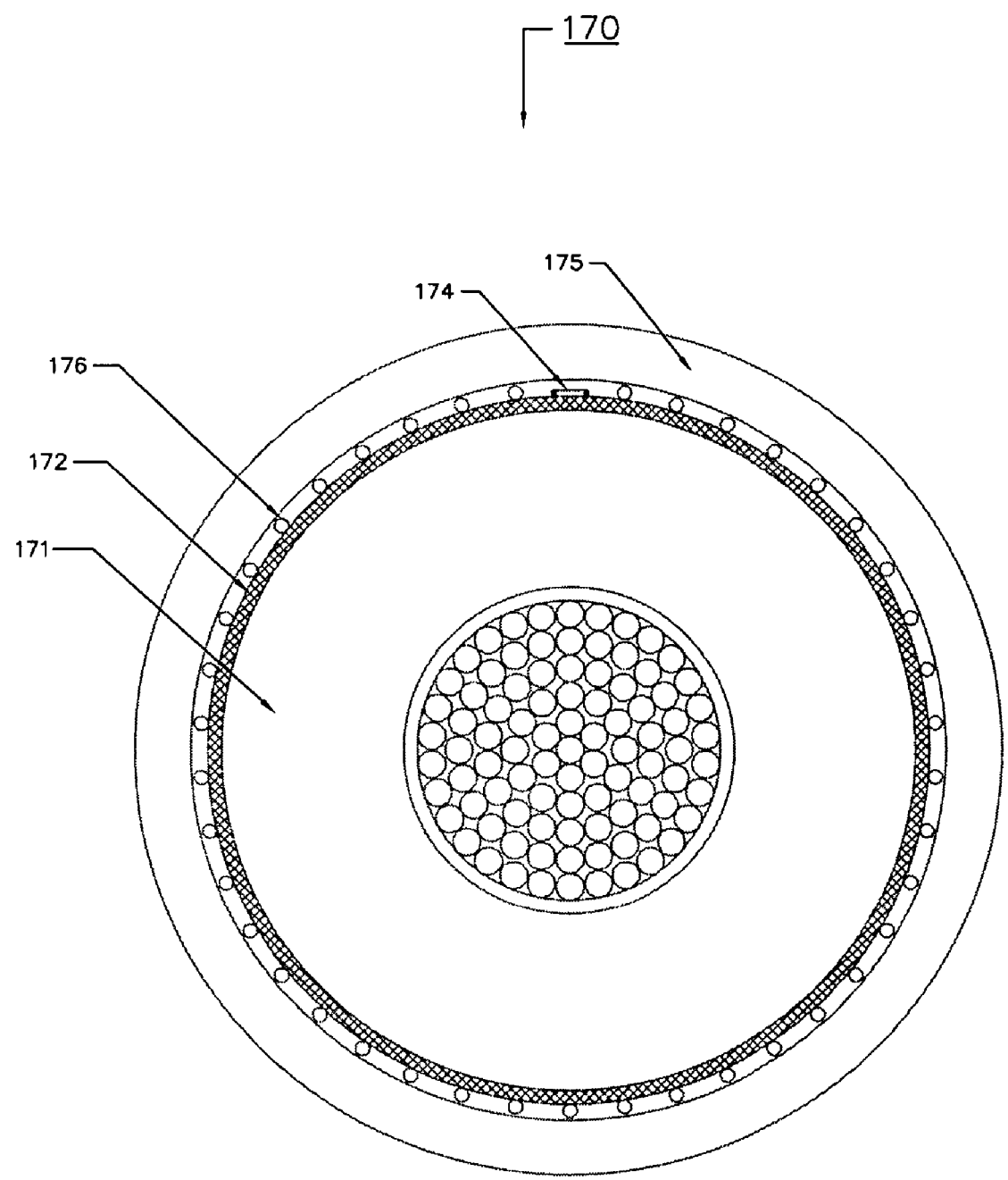
FIG. 70 is a cross section of a cable where the holding member replaces a stranded neutral.

FIG. 70 illustrates an embodiment of the electrical conductor cable (170), wherein the core (171) is surrounded by a layer of insulating/bedding tape (172). Concentric stranded neutrals (176) are then placed on the exterior side of the tape (172). A holding member (174) replaces one of the concentric stranded neutrals (176). The concentric stranded neutrals (176) are then surrounded by water swellable tape (177) that is longitudinally or cigarette wrapped around the neutrals (176). A jacket (175) is formed on the exterior side of the water swellable tape (177).

Figure 80:
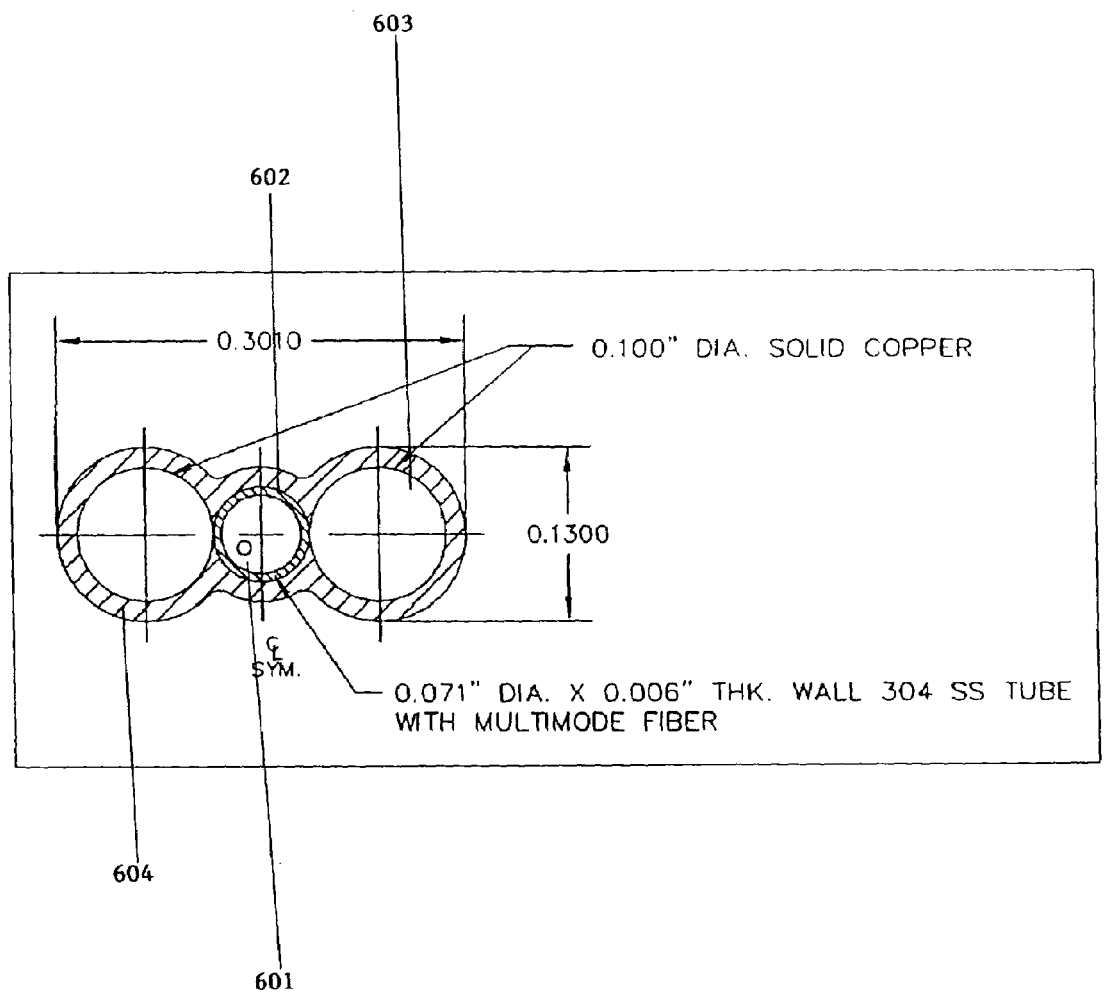
FIG. 80 is a cross-section of one embodiment of the present invention where the holding member is attached to two strength members.

FIG. 80 depicts a cross-section of one embodiment of the present invention wherein the holding member (602) contains a fiber optic (601) and is attached to two strength members (603) by jacket material (604). Advantageously jacket material (604) is polyethylene that has been extruded onto the strength member and the holding member. The holding member has at least one strength member; advantageously there are two strength members adjacent to and/or attached to the holding member and on opposite sides of the holding member.

Advantageously the present invention is an electrical cable comprising conducting strands; a holding member containing an optic fiber located in the electrical cable; and at least one strength member adjacent the holding member providing additional protection to the optic fiber. More advantageously the present cable has two strength members adjacent the holding member. Preferably the strength member is attached to the holding member. Advantageously the strength member is an electrically conductive material. Preferably the electrically conductive material is copper.

Advantageously the strength member of the present invention is attached to the holding member by polyethylene. Most advantageously the strength member and the holding member are attached by a polyethylene jacket. Preferably the polyethylene jacket is semiconducting and is extruded onto the strength member and the holding member. Advantageously the strength members are on opposite sides of the holding member. In some applications the diameter of the strength member is greater than the diameter of the holding member. Advantageously the holding member is a steel tube, preferably a stainless steel tube.

A further embodiment of the present invention is an electrical cable comprising a conducting core; a layer of insulating/bedding tape surrounding the core; a corrugated welded armor surrounding the layer of insulation/bedding tape; a first holding member arranged longitudinally along the cable between the layer of insulation/bedding tape and the corrugated welded armor; and at least one strength member adjacent the first holding member. Advantageously the holding member is oval shaped and forms at least one opening. Advantageously the opening is circular or oval shaped. The present cable may further comprise a second holding member arranged longitudinally along the cable. Advantageously the second holding member is on the opposite side of the cable from the first holding member. The second holding member may be located between the layer of insulation bedding tape and the corrugated welded armor. The present cable may further comprise a third holding member arranged longitudinally along the cable and may further comprise a fourth holding member arranged longitudinally along the cable. Advantageously the cable further comprises an outer jacket material, wherein the holding member and strength member are arranged longitudinally along the cable in the jacket material. The present cable may further comprise stranded neutrals.

The electrical cable of the present invention may also comprise a conductive core; a means for holding an optic fiber; and a means for strengthening the holding means. Advantageously the cable further comprises a layer of insulating bedding/tape surrounding the core; and stranded neutrals placed over the layer of insulating bedding/tape, wherein one of the stranded neutrals is replaced by the means for holding an optic fiber.

Further variations and modifications of the foregoing will be apparent to those skilled in the art and are intended to be encompassed by the claims appended hereto.

What is claimed is:

1. An electrical cable comprising:
    a conducting core;
    a layer of insulation surrounding the core;
    a corrugated welded armor surrounding the insulation layer;
    a holding member containing an optic fiber arranged longitudinally along the cable;
    at least one strength member adjacent the holding member providing additional protection to the optic fiber, wherein the strength member is attached to the holding member by polyethylene, and wherein the strength member and the holding member are attached by a polyethylene jacket.

2. The cable of claim 1 wherein the polyethylene jacket is semiconducting and is extruded onto the strength member and the holding member.

3. The cable of 1 wherein the holding member is a steel tube.

4. An electrical cable comprising:
    a conducting core;
    a layer of insulation surrounding the core;
    a corrugated welded armor surrounding the layer of insulation;
    a first holding member arranged longitudinally along the cable between the layer of insulation and the corrugated welded armor; and
    at least one strength member adjacent the first holding member.

5. The cable of claim 4, wherein the holding member is oval shaped and forms at least one opening.

6. The cable of claim 5, wherein the opening is oval shaped.

7. The cable of claim 5, wherein the opening is circular shaped.

8. The cable of claim 4, further comprising a second holding member arranged longitudinally along the cable.

9. The cable of claim 8, wherein the second holding member is on the opposite side of the cable from the first holding member.

10. The cable of claim 8, wherein the second holding member is located between the layer of insulation and the corrugated welded armor.

11. The cable of claim 8, further comprising a third holding member arranged longitudinally along the cable.

12. The cable of claim 11, further comprising a fourth holding member arranged longitudinally along the cable.

13. The cable of claim 4, further comprising an outer jacket material, wherein the holding member and strength member are arranged longitudinally along the cable in the jacket material.

14. The cable of claim 4, further comprising stranded neutrals.

* * * * *